United States Patent [19]

Wiedermann

[11] 4,404,294
[45] Sep. 13, 1983

[54] NONFLAMMABLE LIGHT FOAMS CONTAINING UREA AND URETHANE GROUPS IN WHICH A MONO- AND/OR OLIGO-SACCHARIDE DISSOLVED IN WATER IS REACTED WITH A POLYISOCYANATE IN THE PRESENCE OF A POLYOL, A CATALYST AND A FLAMEPROOFING AGENT

[75] Inventor: Rolf Wiedermann, Odenthal, Fed. Rep. of Germany

[73] Assignee: Bayer Aktiengesellschaft, Leverkusen, Fed. Rep. of Germany

[21] Appl. No.: 360,547

[22] Filed: Mar. 22, 1982

[30] Foreign Application Priority Data

Apr. 2, 1981 [DE] Fed. Rep. of Germany ....... 3113387

[51] Int. Cl.³ .............................................. C08G 18/14
[52] U.S. Cl. .................................. 521/107; 521/109; 521/172
[58] Field of Search ........................ 521/107, 109, 172

[56] References Cited

U.S. PATENT DOCUMENTS 4,291,129 9/1981 Kennedy .............................. 521/103

FOREIGN PATENT DOCUMENTS 5903 12/1979 European Pat. Off. .
1173446 7/1964 Fed. Rep. of Germany .
1382538 2/1975 United Kingdom .

Primary Examiner—Maurice J. Welsh
Attorney, Agent, or Firm—Gene Harsh; Joseph C. Gil; Whalen, Lyndanne M.

[57] ABSTRACT

Light foams containing urea and urethane groups and having a density of at most 0.025 g/cc are produced by reacting a polyisocyanate with at least one equivalent of water in which mono- and/or oligo-saccharides have been dissolved (as blowing agent) in the presence of organic compounds containing at least two hydroxyl groups and having an OH number of from 30 to 250, a catalyst and a flameproofing agent. Chain extending agents having a molecular weight of from 32 to 62 and other known auxiliaries and additives may also be used. The foams thus produced are nonflammable and are particularly useful in insulation applications.

8 Claims, No Drawings

NONFLAMMABLE LIGHT FOAMS CONTAINING UREA AND URETHANE GROUPS IN WHICH A MONO- AND/OR OLIGO-SACCHARIDE DISSOLVED IN WATER IS REACTED WITH A POLYISOCYANATE IN THE PRESENCE OF A POLYOL, A CATALYST AND A FLAMEPROOFING AGENT

FIELD OF THE INVENTION

The present invention relates to a process for the production of nonflammable light foams containing urea and urethane groups and to the light foams made by this process.

SUMMARY OF THE INVENTION

It is an object of the present invention to provide a process for the production of nonflammable light foams.

It is also an object of the present invention to provide a process for making nonflammable light foams useful for insulation purposes.

It is another object of the present invention to provide a nonflammable light foam containing urea and urethane groups having a density less than or equal to 0.025 g/cm$^3$.

These and other objects which will become apparent to those skilled in the art are accomplished by reacting a polyisocyanate with at least one equivalent of water in which a mono- and/or oligosaccharide has been dissolved in the presence of an organic compound having at least two hydroxyl groups (OH number from 30 to 250), a catalyst and a flameproofing agent.

DETAILED DESCRIPTION OF THE INVENTION

In the context of the present invention the term, light foams, does not refer to the known flexible polyurethane foams, but rather to foams which are more like rigid polyurethane foams in character. For example, a paper-lined sheet produced in accordance with the present invention reaches a compressive strength of 0.05 MPa for a gross density of 17 kg/m$^3$. Foams according to the present invention having a gross density of 12 kg/m$^3$ are so rigid that they do not sag under their own weight when used for insulating rafters. For this particular application (i.e., insulation of rafters), the products of the present invention should have a gross density of at most 25 kg/m$^3$ (0.025 g/cc) and preferably of at most 20 kg/m$^3$ (0.02 g/cc).

Polyurea foams produced by reacting polyisocyanates with water in the presence of catalysts and other agents such as plasticizers, stabilizers, fillers, flameproofing agents and, optionally, polyols, are described, for example, in European Pat. No. 5903. However, foams of this type cannot be safely used in the construction industry because they do not meet the requirements of the B2 or B1 classification according to DIN 4102.

It is also known that starch and other polysaccharides improve flame resistance in rigid PUR foams. However, as shown in Example 7 (infra), this effect (i.e., improved flame resistance) does not occur with light polyurea foams. It has surprisingly been found that use of an aqueous mono- and/or saccharide solution (which solution introduces the same quantity of water as before into the formulation) yields light foams which do satisfy the requirements of Class B2 according to DIN 4102. It has also been found that use of an aqueous saccharide solution in making a light polyurethane foam is also advantageous in that the product foams are less sensitive to shrinkage.

In the present invention, nonflammable light foams containing urea and urethane groups and having a density of at most 0.025 g/cc are produced by reacting a polyisocyanate with water soluble mono- and/or oligosaccharides and water as the blowing agent in the presence of organic compounds containing at least two hydroxyl groups and having an OH number of from 30 to 250, a catalyst and a flameproofing agent. Typically, phosphorus-containing organic compounds are used as the flameproofing agent. Chain-extending agents having a molecular weight of from 32 to 62 and other auxiliaries and additives known to those in the art may also be included in the reaction mixture. In the practice of the present invention, the polyisocyanate is generally reacted with at least one equivalent of water in which the mono- and/or oligisaccharide has been dissolved.

In the present invention it is preferred that from 2 to 30 parts by weight of mono- and/or oligosaccharide be used for each 100 parts by weight of polyisocyanate. It is also preferred that an aqueous solution of monosaccharides which solution contains at least 10 wt. % (based on monosaccharides) of oligosaccharides. In many cases, a sorbose having an oligosaccharide content of from 10 to 80 wt. % may be advantageously used as the mono- and/or oligosaccharide.

The polyisocyanate used in making the foams of the present invention may be any one or more of those known to those skilled in the art of polyurethane chemistry. Examples of polyisocyanates generally used in the production of polyurea, polyurethane and/or polyisocyanurate foams are described in detail, for example, in German Offenlegungsschrift No. 2,922,967, pages 13–16. The preferred polyisocyanate for the practice of the present invention is a mixture of diphenyl methane diisocyanates and polyphenyl polymethylene polyisocyanates which mixture contains at most 50 wt. % of 4,4'- and 2,4'-diphenyl methane diisocyanate.

Water soluble mono- and/or oligosaccharides suitable for use in the process of the present invention are known to those in the art. Examples of appropriate materials include: xylose, arabinose, glucose, mannose, galactose, fructose, sorbose, sucrose, maltose, cellubiose, and dextrins and starches degraded by treatment with acids. Glucose, fructose, and sucrose are preferred and a sorbose having an oligosaccharide content of from 10 to 80 wt. % is most preferred.

Organic compounds containing at least two hydroxyl groups and having a hydroxyl number of from 30 to 250 and preferably from 50 to 200 (molecular weights of from 62 to 10,000) suitable to the practice of the present invention are known to those in the art. Compounds of this type are, in particular, compounds containing from 2 to 8 hydroxyl groups and preferably diols and polyols containing from 2 to 4 hydroxyl groups. Examples of such compounds are the polyesters, polyethers, polythioethers, polyacetals, polycarbonates and polyester amides known by those in the art to be useful for the production of cellular and noncellular polyurethanes. Specific examples of such compounds are: ethylene glycol, diethylene glycol, butane diol, hexane diol, glycerol and hexane triol. Other hydroxyl group-containing polyesters, polyethers, polythioethers, polyacetals, polycarbonates and polyester amides and their derivatives suitable for use in accordance with the invention are described in detail, for example, in German Offenlegungsschrift No. 2,992,967, pages 17-24. Low molecular weight organic compounds containing at leat two OH groups (molecular weights of from 62 to about 400) which have on OH number of from 30 to 250 are described, for example, in German Offenlegungsschrift No. 2,922,967, pages 25-26.

Appropriate flameproofing agents are known to those in the art. Phosphorus-containing organic compounds are typically used. Trichloroethyl phosphate, tricresyl phosphate, and triethyl phosphite are specific examples of such materials. In the practice of the present invention such flameproofing agents are generally used in quantities of from 0.5 to 10 wt. % (based on the foamable reaction mixture).

Water in which the mono- and/or oligosaccharides have been dissolved is used as the blowing agent in a quantity which is at least one equivalent, based on the amount of polyisocyanate.

The low molecular weight (molecular weight 32 to 62) chain extending and cross-linking agents which may be used in the present invention are known to those in the art. Such compounds are described in detail in German Offenlegungsschrift No. 2,922,967, pages 25-28.

The auxiliaries and additives which may also be used in the practice of the present invention include readily volatile inorganic or organic substances as blowing agents; known catalysts (generally used in a quantity of from about 0.001 to 10 wt. % based on the quantity of compounds containing at least two OH groups); surface-active additives (such as emulsifiers and foam stabilizers); reaction retarders; stabilizers against the effects of ageing and weather; plasticizers; fungistatic and bacteriostatic substances; and fillers, such as barium sulfate, kieselguhr, carbon black or whiting. These auxiliaries and additives are described in detail, for example, in German Offenlegungsschrift No. 2,922,967, pages 32-37. Further examples of surface-active additives and foam stabilizers, cell regulators, reaction retarders, stabilizers, flameproofing agents, plasticizers, dyes, fillers and fungistatic and bacteriostatic substances and information on the way in which these additives may be used and the way in which they work can be found in Kunststoff-Handbuch, Vol. VII, by Vieweg and Hochtlen, Carl-Hanser-Verlag, Munich, 1966, for example, on pages 103-113.

In the process of the present invention the reaction components may be reacted by a one-shot process, a prepolymer process or a semi-prepolymer process known to those in the art. Suitable processing apparatus are described in U.S. Pat. No. 2,764,565. Particulars of other processing machines which may be used in the practice of the present invention can be found in Kunststoff-Handbuch, Vol. VII, by Vieweg and Hochtlen, Carl-Hanser-Verlag, Munich, 1966, for example, on pages 121-205. The foams of the present invention may also be produced by block foaming or by a known laminator process.

The products of the present invention may be used as insulating materials in building construction, for example, for steep roofs, pipes or facades. Due to its open cell structure, the foam of the present invention may also be used for sound insulation.

Having thus described my invention, the following examples are given by way of illustration. The percents given are percents by weight, unless otherwise indicated.

EXAMPLES

The components used in each of Examples 1 to 9 are given in the following Table. These components were stirred using a laboratory stirrer rotating at 4000 rpm. The starting temperature of the components was 23° C. The data for the light foams obtained are also shown in the following Table.

Examples 1, 5, 7 and 9 are comparison examples.

TABLE

| Example No. | 1 | 2 | 3 | 4 | 5 | 6 | 7 | 9 |
|---|---|---|---|---|---|---|---|---|
| Triethyl amine(+) | 2 | 2.5 | 2.5 | 2.5 | — | — | 2 | 2.5 |
| Dimethyl cyclohexylamine(+) | — | — | — | — | 2 | 2 | — | — |
| Trichlorofluoromethane(+) | 40 | 40 | 40 | 40 | 40 | 40 | 40 | 40 |
| Polypropylene glycol(+) OH number 56 | 34 | 34 | 34 | 34 | 25 | 25 | 34 | 34 |
| Trichloroethyl phosphate(+) | 34 | 34 | 34 | 34 | 25 | 25 | 34 | 34 |
| Silicone stabilizer(+) | 1.7 | 1.7 | 1.7 | 1.7 | 1.2 | 1.2 | 1.7 | 1.7 |
| Water(+) | 10 | — | — | — | 10 | — | 10 | 10 |
| Glycerol(+) | — | — | — | — | 3 | 3 | | |
| Solution I$^{a(+)}$ | | 33 | | | — | 33 | | |
| Solution II$^{b(+)}$ | | | 16 | | | | | |
| Solution III$^{c(+)}$ | | | | 33 | | | | |
| Starch(+) | | | | | | | 20 | |
| Sorbitol(+) | | | | | | | | 20 |
| Polymeric 4,4'-diphenyl(+) methane diisocyanate containing 45% of 4,4'-MDI | 100 | 100 | 100 | 100 | 100 | 100 | 100 | 100 |
| Stirring time (secs.) | 5 | 5 | 5 | 5 | 5 | 5 | 5 | 5 |
| Standing time (secs.) | 7 | 8 | 8 | 8 | 7 | 7 | 8 | 8 |
| Gel time (secs.) | 45 | 45 | 45 | 45 | 39 | 48 | 47 | 46 |
| Shrinkage RT | no | no | no | no | yes | no | no | no |
| Gross density kg/m$^3$ | 8 | 10 | 9 | 10 | 7.8 | 10 | 10 | 10 |
| Coefficient of thermal conductivity W/K.m. | | | 0.042 | | | | | |
| DIN 4102 classification | B3 | B2 | B2 | B2 | B3 | B2 | B3 | B3 |
| Flame application, edge, K: (mm) | >150 | 100 | 120 | 100 | >150 | | >150 | >150 |
| Flame application, | | | | | | | | |

TABLE-continued

| Example No.  | 1   | 2   | 3   | 4   | 5 | 6 | 7 | 9 |
|---|---|---|---|---|---|---|---|---|
| surface, F: | 120 | 100 | 120 | 120 | | | | |

Solution I$^a$: 30% of water, 30% of oligo sucrose, 40% of sorbitol
Solution II$^b$: 62% of water, 38% of cane sugar
Solution III$^c$: 30% of water, 18% of oligo sucrose, 52% of sorbitol
$^{(+)}$parts by weight

EXAMPLE 8

The formulation of the foam of Example 2 was modified to the extent that 32 parts by weight of an ester (produced from adipic acid, diethylene glycol, glycerol; molecular weight 500, hydroxyl number 450) were used. The foam obtained, which had a gross density of 13 kg/m$^3$, was more elastic than the foam of Example 2 and retained the B2 classification according to DIN 4102.

What is claimed is:

1. A process for the production of nonflammable light foams containing urea and urethane groups and having a density less than or equal to 0.025 g/cm$^3$ in which a polyisocyanate is reacted with at least one equivalent of water in which a mono- and/or oligosaccharide has been dissolved in the presence of (a) an organic compound having at least two hydroxyl groups and an OH number of from 30 to 250, (b) a catalyst, and (c) a flameproofing agent.

2. The process of claim 1 wherein the reaction is carried out in the presence of a chain extending agent having a molecular weight of from 32 to 62.

3. The process of claim 1 wherein the flameproofing agent is a phosphorous-containing organic compound.

4. The process of claim 1 wherein from 2 to 30 parts by weight of mono- and/or oligosaccharide per 100 parts by weight of polyisocyanate are used.

5. The process of claim 1 wherein an aqueous monosaccharide solution containing at least 10 wt. % (based on the monosaccharide) of an oligosaccharide is reacted with the polyisocyanate.

6. The process of claim 1 wherein a sorbose having an oligosaccharide content of from 10 to 80 wt. % is used as the mono- and/or oligosaccharide.

7. The process of claim 1 wherein the polyisocyanate is a mixture of diphenyl methane diisocyanates and of polyphenyl polymethylene polyisocyanates which mixture contains no more than 50 wt. % of 4,4'-and 2,4'-diphenyl methane diisocyanate.

8. A nonflammable light foam containing urea and methane groups and having a density less than or equal to 0.025 g/cm$^3$ which foam is the reaction product of (a) a polyisocyanate, (b) a solution of a mono- and/or polysaccharide in water, (c) an organic compound having at least two hydroxyl groups and an OH number of from 30 to 250, (d) a catalyst, and (e) a flameproofing agent.

* * * * *